United States Patent [19]

Scott

[11] Patent Number: 4,589,935

[45] Date of Patent: May 20, 1986

[54] METHOD OF INDUCTION HARDENING OF GEAR TEETH

[75] Inventor: John R. A. Scott, Hawcoat, United Kingdom

[73] Assignee: Vickers Shipbuilding & Engineering Limited, Cumbria, England

[21] Appl. No.: 631,923

[22] Filed: Jul. 18, 1984

[30] Foreign Application Priority Data

Jul. 22, 1983 [GB] United Kingdom ............... 8319788

[51] Int. Cl.$^4$ ................................................ C21D 1/10
[52] U.S. Cl. .................................. 148/147; 148/150; 148/154; 219/10.43; 219/10.59
[58] Field of Search ............... 148/143, 145, 147, 150; 219/7.5, 10.41, 10.43, 10.59

[56] References Cited

FOREIGN PATENT DOCUMENTS 864048 3/1961 United Kingdom .

*Primary Examiner*—Christopher W. Brody
*Attorney, Agent, or Firm*—Mason, Kolehmainen, Rathburn & Wyss

[57] ABSTRACT

Disclosed is a process and apparatus for induction hardening of the flank, root and tip surfaces of gear teeth so as to provide a surface-hardened layer along said surfaces. An electrically energizable inductor head carries out movement along the space between a pair of adjacent gear teeth, the inductor head having an external profile matching the profile of the space between the gear teeth. Guides maintain clearances between the inductor head and the tooth surfaces, during movement of the inductor head, the clearance being a minimum between the inductor head and the root surface and varying in predetermined manner along the flank surfaces to achieve heating along the flanks and root surfaces to a uniform predetermined temperature. Jets of coolant are directed to the surfaces of the unheated flanks, tips, heated flanks and root of the pair of gear teeth to achieve rapid cooling of said surfaces. The gear is immersed in mineral oil or other non-aqueous quenching agent. The height of the inductor head is less than the depth of the space between the root and tip surfaces of each pair of gear teeth. The operating parameters of (a) the predetermined clearances, (b) the rate of electrical energy supplied to, and the speed of movement of the inductor head and (c) the rate of cooling, are controlled to form a uniform thickness surface-hardened layer from tip to tip along the flanks and root surfaces of the pair of gear teeth, the surface-hardened layer having an internal structure which imparts the equivalent of a built-in compressive stress in its surface, at least in the region of the root curve and its transition to the flank surfaces. This compressive stress enables each tooth to withstand tensile stresses which are applied to gear teeth, when intermeshing gear teeth apply fatigue bending loads to each other.

7 Claims, 8 Drawing Figures

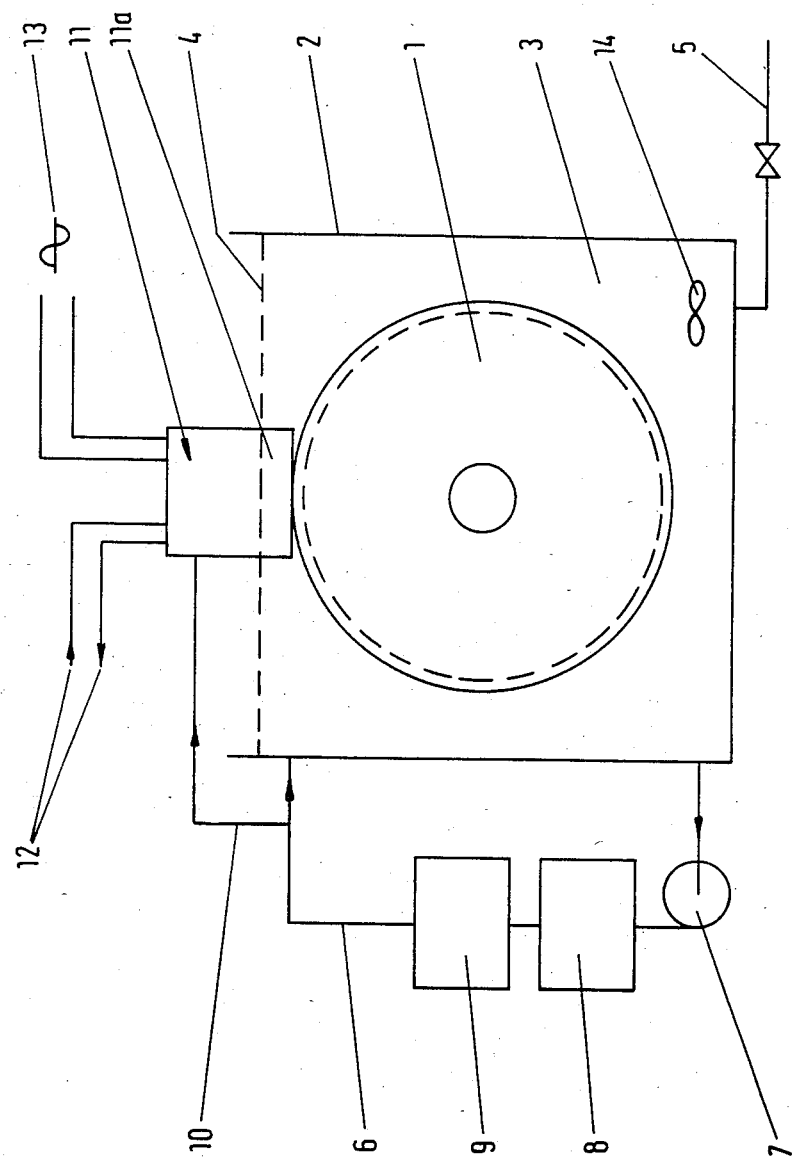

METHOD OF INDUCTION HARDENING OF GEAR TEETH

This apparatus relates to a process and apparatus for surface-hardening gear teeth by inductive heating.

The invention has been developed primarily in relation to the production of surface-hardened gear teeth for high powered marine application where reliability is paramount. However, the invention is also applicable to other areas of use of gears or other components in which improved operating performance is required i.e. (a) a gear of a particular size and design can operate satisfactorily with at least as high tooth loadings as is possible with existing gear treatment techniques or (b) gear sizes can be reduced while still providing the same torque-transmitting capacity as is possible with larger gears treated with existing techniques. In case b, the reduction in size of gears which is possible enables dramatic reduction in overall volumes of gear boxes and gear transmissions i.e. the housings accommodating a train of gears, with evident advantages in drive-train arrangements in which efficient use of space available is important. Case b is also particularly advantageous for marine gear transmissions.

Where high powers are to be transmitted and high levels of reliability are required, hardened gear teeth are desirable. The ideal condition is gear teeth having a tough core to resist fatigue bending stresses and a hard surface layer to withstand the Hertzian contact stresses. There are three main methods of hardening gear teeth, as follows:

(i) Carburising—a process in which carbon diffuses into the heated metal. This gives a deep hard surface layer, but with considerable distortion of the metal requiring a great deal of grinding to achieve the final dimensions.

(ii) Induction Hardening—a process of localised heat treatment. The surface hardness is less than with carburising, but there is very little distortion of the tooth profile requiring significantly less final grinding.

(iii) Nitriding—a process in which gaseous nitrogen diffuses in to the metal to give a thin surface layer which may not require final grinding after treatment.

Of these methods, induction hardening is the most suitable for large high powered marine gearing elements where a high degree of reliability is essential.

In this specification "induction hardening" refers to the inductive heating of the surface layers of metal gear teeth followed by rapid controlled cooling to yield a hard thick surface layer fast with the metal substrate.

Inductive heating is a well known technique by which substances capable of conducting electricity may be heated. Certain alloys, particularly steels, may be hardened by heating and subsequent controlled cooling. As inductive heating may be selectively applied to localised area of a component, heating of the localised area followed by controlled cooling can produce localised hardening, e.g. of the surface of a gear tooth, while the substrate is unaffected. In this way, gear teeth may be produced with hard, wear-resistant surfaces on a substrate which is flexible and allows for deflection under load.

Many induction hardening processes are in use, but most either cannot produce gears with consistent properties for every tooth in the gear wheel and from one gear wheel to another or which can not operate reliably under high tool loadings. Common causes of failure are cracking or spalling of the hardened surfaces, particularly at the tips or edges of the teeth. Most induction hardening processes either regularly, or occasionally, induce internal tensile stresses into the metal at the tooth root. This greatly reduces the load the teeth can transmit as tooth loading causes tensile bending stresses in the root and, if residual tensile stresses also exist at the root, the tooth could fail by breakage under the bending fatigue condition.

The present invention seeks to overcome the gear failure problems encountered with known induction hardening techniques, by providing a process and apparatus which can generate a surface-hardened layer of substantially uniform thickness from the tip, along one flank of one gear tooth, around the root and along the flank of the next adjacent gear tooth to the tip thereof, in which the layer has an internal structure which provides the equivalent to a built-in compressive stress in at least the regions of the tooth surfaces which are exposed to the greatest bending or other stresses in service so as to improve the bending fatigue properties.

According to one aspect of the invention there is provided a process for induction hardening of the flank, root and tip surfaces of the teeth of a gear so as to provide a surface-hardened layer along said surfaces, the process comprising:

(1) causing relative traversing movement of an electrically energisable inductor head along the space between a pair of adjacent gear teeth, the inductor head having an external profile substantially matching the profile of the space defined between the gear teeth;

(2) guiding the traversing movement of the inductor head so as to maintain predetermined clearances between the outer surface of the inductor head and the root and flank surfaces of the pair of gear teeth, the clearance being a minimum between the inductor head and the root surface and varying in predetermined manner along the flank surfaces in such a way as to achieve heating along the flank and root surfaces to a substantially uniform predetermined temperature suitable for induction hardening; and (3) directing coolant to the surfaces of the unheated flanks, the tips, the heated flanks and the roots of the pair of gear teeth so as to achieve relatively rapid cooling of said surfaces;

characterised in that:

(a) the entire gear is immersed in a tank of coolant;

(b) the coolant is oil or other non-aqueous quenching agent;

(c) the height of the inductor head is less than the depth of the space between the root and tip surfaces of each pair of gear teeth; and (d) the operating parameters of (i) the predetermined clearances, (ii) the rate of electrical energy supplied to, and the speed of traversing movement of the inductor head and (iii) the rate and method of cooling, are controlled in such a way as to form a substantially uniform thickness surface-hardened layer from tip to tip along the flank and root surfaces of the pair of gear teeth, said surface-hardened layer having an internal structure which provides the equivalent of a built-in compressive stress in at least the region of each root surface and its transition to the adjoining flank surface.

The immersion of the entire gear in a tank containing oil or other non-aqueous quenching agent (features a and b) provides a relatively gentle quenching action (as compared with water quenching), in which there is provided an essentially isothermal environment in which substantially all of the heat generated in the gear during one traverse of the inductor head can be dissipated sufficiently, but not too rapidly, so as to achieve the required surface-hardening and depth of case, before a second traverse is commenced.

By providing an inductor head which has a lesser height than the depth of the space between the root and tip surfaces of each pair of gear teeth (feature c), it is possible for a satisfactory surface-hardened layer to be formed up to the tip surface of each gear tooth, but without the risk of overheating of the gear tip which could otherwise give rise to possible problems of "spalling" or flaking-off of portions of the gear tip.

The control of the operating parameters (feature d) enables a surface-hardened layer to be formed which effectively has a net built-in compressive stress in its surface, or the equivalent thereof, at least at the surface region of each tooth which is the most highly stressed in service, namely the root surface (at the bottom of each tooth space) and the transition between the root surface and each adjoining flank surface.

While it is not entirely clear exactly what type of internal structural rearrangement takes place within the surface hardened layer, following treatment by the process according to the invention, it is of such a nature (as found by metallurgical analysis, testing and operational experience) that it provides a built-in compressive stress in the surface of the layer whereby each gear tooth can more readily withstand the effect of tensile-induced stresses resulting from applied bending loads to the tooth in service i.e. the fatigue bending properties are greatly improved. In effect, the surface hardened layer has an integral "skin" which has the built-in compressive stress.

According to a further aspect of the invention there is provided induction hardening apparatus for hardening of the flank, tip and root surfaces of the teeth of a gear so as to provide a surface-hardened layer along said surfaces, the apparatus comprising:

an electrically energisable inductor head having an external profile substantially matching that of the space defined between a pair of adjacent gear teeth;

means for causing guided relative traversing movement of the inductor head along said space, while maintaining predetermined clearances between the outer surface of the inductor head and the root and flank surfaces of the pair of gear teeth;

a coolant tank having means for mounting the gear therein so as to be totally immersed in coolant when the tank is charged with coolant; and means for directing coolant towards and into the space between the pair of gear teeth during the traversing movement of the inductor head.

Preferably, when the apparatus is used to surface-harden the teeth of a gear wheel, the tank includes means for rotatably mounting the gear wheel in a substantially vertical position, with the entire gear wheel, and the inductor head, immersed in the tank coolant. The coolant tank is able to provide an essentially isothermal environment during hardening, which allows for for the gear to fully achieve an isothermal temperature prior to hardening, and thus only those stresses generated during hardening actually remain in the surface layers of the gear wheel teeth.

In the process and apparatus of the invention, it is preferred that cooling of the inductively heated surfaces of the gear teeth includes the provision of a predetermined dwell period between the end of one traverse of the inductor head along the space between one pair of gear teeth and the next traverse along the space between the adjacent pair of gear teeth. The coolant in the tank provides further cooling of the gear teeth and adjacent parts of the gear during the dwell period. Preferably, external means of cooling the coolant in the tank may be provided.

At the end of each traverse of the inductor head, it is preferred that the gear be indexed (manually or automatically under pre-selected operation of programmable controls of the apparatus) so as to bring the next pair of gear teeth into register with guides for the inductor head.

When the gear teeth are helical, the gear will be rotated simultaneously with the traversing movement of the inductor head so as to constantly maintain the predetermined clearances.

A particularly preferred embodiment of apparatus for carrying out a process for induction hardening a gearwheel comprises:

a water-cooled inductor so constructed that it combines the maximum volume of intensifying substance with the minimum volume of electrical conductor so that the maximum intensity of field is created where required with the minimum of unwanted effects, the shape of said inductor being accurately profiled to fit the space between the adjacent gear teeth with predetermined clearances between said inductor and the metal of the gear root and flanks;

first means for accurately guiding said inductor into, along and out of one space between first two adjacent gear teeth and into the next space between the second two adjacent gear teeth and so progressively around the gearwheel while continuously maintaining said predetermined clearances;

second means associated with said first means which continuously maintains said clearance between said inductor and the metal of the gear root and flanks throughout each and every traverse;

means for moving said inductor across the face of the gearwheel, and rotating said gearwheel either independently of or in conjunction with the motion of said inductor;

means for providing a progressive build-up and fall of heat into the gear teeth at the start or end of each traverse by the use of chamfered runs-in and runs-out respectively at both ends of the gear teeth;

means for providing a dwell period at the end of each traverse;

means for providing electrical power to said inductor, said electrical power being of suitable form for generating heat by induction in the adjacent gear teeth;

means for providing cooling water to said inductor;

means for providing a plurality of jets of cool filtered mineral oil or other non-aqueous quenching medium onto the gear elements for the purposes of applying controlled cooling to the metal surfaces adjacent to the moving inductor and to the unheated flanks of the gear teeth which are being hardened;

means of supplying filtered, temperature-controlled oil to the plurality of jets adjacent to said inductor;

a tank, fitted with means of rotatably mounting a gearwheel in the vertical plane, which is of sufficient depth to more than allow said rotatably mounted gearwheel to be completely submerged in mineral oil;

means for filling said tank with mineral oil and of emptying and storing said oil when not in use;

means of circulating large volumes of oil within the tank to create essentially isothermal conditions around the gearwheel and throughout the tank; and means of filtering and controlling the temperature of the oil to achieve essentially isothermal conditions within said tank.

The means of providing a progressive build-up or fall of heat into the gear teeth at the start or end of each traverse may be alternatively by varying the electrical power to the inductor, or by chamfering of the edges of the gear teeth.

Alternatively, the means of providing a progressive build up or fall of heat into the gear teeth at the start or end of each traverse may be by varying the speed of motion of the inductor as said inductor enters or leaves the tooth space.

Preferably, means is provided monitoring the flows of cooling water and of each of the plurality of cool filtered oil jets to detect any failure and for causing preventive action, e.g. switching-off the power to the inductor, should such a failure be detected.

For a clearer understanding of the invention and to show how it may be put into effect, reference will now be made, by way of example only, to the accompanying drawings in which:

FIG. 1 is a block diagram of an induction hardening process and apparatus according to the invention;

FIG. 2a is an elevational view of an inductor head for use in the process and apparatus;

FIG. 2b is a sectional view of the inductor head taken on A—A in FIG. 2a;

Figures 2A, 2B:
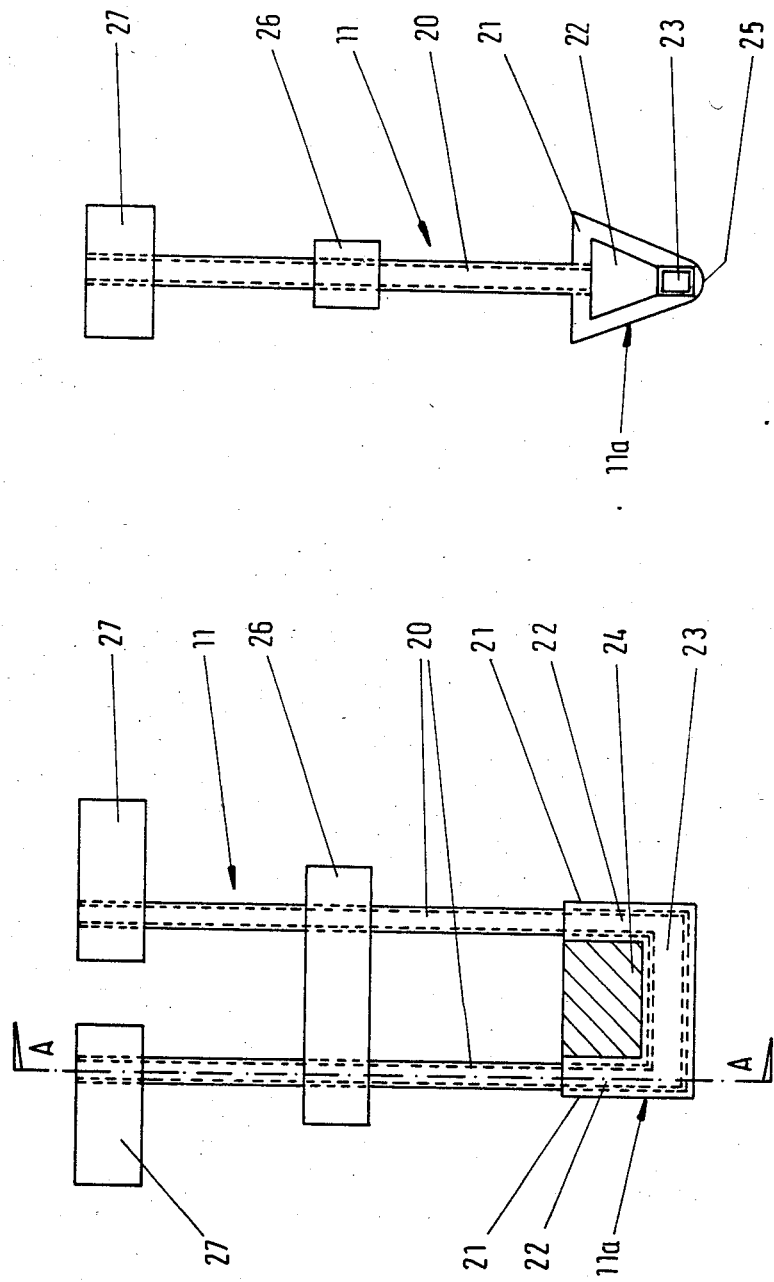

Referring to FIG. 1, a gearwheel 1 is rotatably mounted in a deep tank 2. Tank 2 is filled with coolant for removing heat generated during the induction hardening process, and is a mineral oil 3 or other non-aqueous quenching agent up to the normal level shown by dotted line 4, i.e. gearwheel 1 is totally immersed. A valved pipeline 5 allows the oil to be drained from tank 2 to a separate storage tank (not shown) or pumped back into tank 2 as required.

A pipe run 6 allows oil to be circulated by pump 7 through a filter 8 and a cooler 9 (if required) back into tank 2. The purpose of pipe run 6 is two-fold. It maintains a continuous filtration of the oil 3 and provides a circulation within the tank 2 to dissipate the heat generated throughout the oil. If required, additional circulation may be provided, e.g. by the use of stirring means 14, in tank 2. Cooler 9 may or may not be required depending on the heat input from induction assembly 11 and the natural heat loss from the tank. Thermostatic control may be used to control cooler 9, if required.

The induction heating assembly 11 is situated above tank 2 with the actual induction head 11a (FIGS. 2a and 2b) located well below oil level 4 at top dead centre of gearwheel 1. The induction heating assembly 11 is supplied externally with filtered, cool oil via pipe 10, internally with cooling water 12 and power from an electrical source 13.

The inductor head 11a is shown in FIGS. 2a and 2b. It has the general form of a right prism with a symmetrical approximately triangular section supported by two copper pipes 20. The copper pipes 20 perform three functions; they rigidly support the prism-shaped inductor head, carry electrical current through the metal into and out of the inductor head and pass cooling water via their bores through the inductor head. At their lower ends, the copper pipes 20 are each secured into a hollow triangular section 21, fabricated from copper plate. At their lowest points, the two triangular sections 21 are interconnected by a rectangular copper tube 23. There is thus electrical continuity from one copper pipe 20, via members 21, 23 and 21 to the other copper pipe 20. The interiors 22 of hollow triangular sections 21 communicate with both copper pipes 20 and rectangular copper tube 23; thus cooling water may flow down one copper pipe 20, via members 22, 23 and 22 to the other copper pipe 20. The central portion of the prism-shaped inductor head 11a is an intensifier 24 and is filled with a suitable non-conducting matrix such an an iron laminate or a proprietary compound.

This particular design of inductor head uses the minimum of copper for conduction purposes (e.g. round pipes 20 instead of square ones) and the maximum of intensifier 24 for a given volume of inductor. This maximises the localised intensifying effect of intensifier 24 while minimising the field which would otherwise overheat the gear tips, i.e. where the metal section is narrowest.

A copper filler piece 25 is secured to the lower edge of rectangular copper tube 23 and the whole head is finished off to give a smooth exterior, the contours of which substantially match those of the spaces between adjacent gear teeth of a particular gearwheel, though with certain clearances as will be explained hereinafter.

A block of insulating material 26 is used to provide rigidity to the copper pipes 20, each of which terminates in a metal block 27. These metal blocks 27 may be secured to the induction heating assembly 11 (FIG. 1) in such a manner that both electrical power and cooling water may be passed to and from each copper pipe 20.

Figure 3:
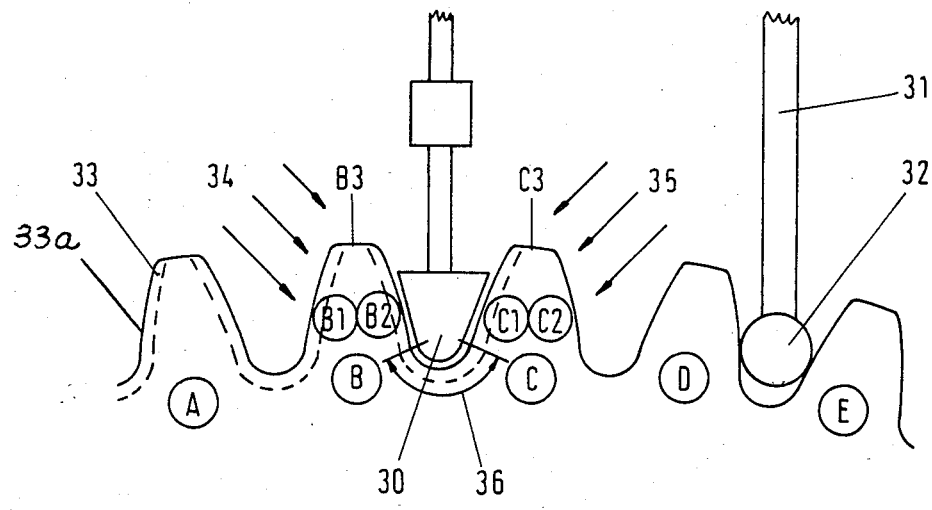
FIG. 3 is a diagrammatic elevation of the inductor head in position in the space between adjacent gear teeth which are to be hardened.
Figure 4:
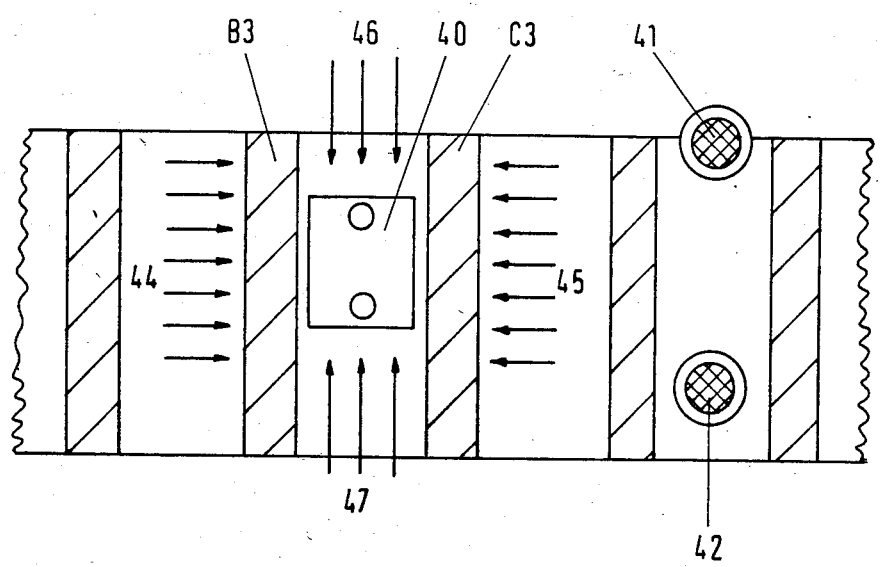
FIG 4 is a projection of FIG. 3 showing a plan view of the inductor head between adjacent gear teeth (the tips of the teeth are shown hatched)

FIG. 3 is a diagrammatic representation of the traversing of an inductor head 30 along the space between adjacent gear teeth. For ease of reference, the gear teeth are designated A–E with the separate flanks of B and C denoted by B1, B2, C1 and C2, and the root surface in the space between the flanks of teeth B and C defined by arc 36. A guide 31 is used to locate inductor head 30 relative to the gear teeth in both vertical and horizontal planes. At its simplest, guides 31 would consist of two pins 41, 42 (FIG. 4) with ball ends 32, one leading and one trailing inductor head 30 (or 40 FIG. 4) as they move backwards and forwards consecutively through the spaces between adjacent gear teeth. Inductor head 30 (40) and guides 31 (41, 42) are firmly located relative to each other via their attachment to the inductor heating assembly 11 (FIG. 1). Provision is made for accurate relative vertical and lateral adjustment between head 30 (40) and guides 31 (41, 42), e.g. by means of shims, vernier screws etc. In order to ensure positive positioning of head 30, a slight pressure is applied to keep the ball ends 32 of guides 31 in contact with the flanks as shown (FIG. 3); as the head 30 moves, the ball ends 32 of guides 31 slide along the tooth flanks so that at least one is always in contact to guide inductor head 30 into, along and out of the gap while maintaining correct clearances (see FIG. 5). The inductor head 30 (40) may be angled on copper pipes 20 for use with helically cut gears. For cross cut (spur) gears the inductor head would have the shape of a right prism (FIGS. 2, 3, 4).

Figures 6A, 6B:
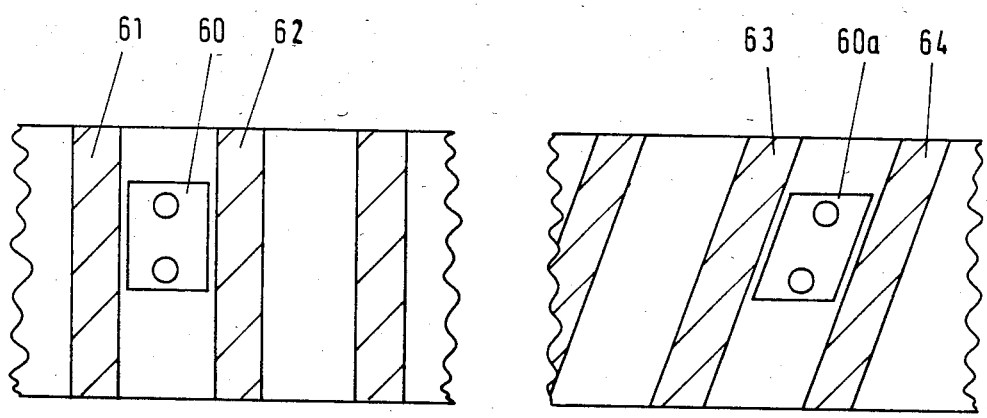
FIGS. 6a and 6b are plan views of upper surfaces of inductor heads for hardening spur and helically cut gears respectively.

FIG. 6a shows in plan view the upper surface of an inductor head 50 which is a right prism suitable for surface hardening movement along the space between a pair of spur gear teeth 61 and 62. FIG. 6b shows an inductor head 60a which is parallelogram shaped prism suitable for surface-hardening movement along the space between a pair of helically cut gear teeth 62 and 64.

The effective inward limit to the substantially uniform thickness induction hardened surface layer (formed on the basic sub-strate of the metal gear) is shown by dashed lines 33. As inductor head 30 moves between teeth B and C, it heats flanks B2, C1 and the included rooth simultaneously. To control the heat flow during heating and remove it at a predetermined rate after cooling, jets of filtered cool oil 34, 35 (44, 45 in FIG. 4) are directed at simple (as shown) or compound angles on to the unheated flanks B1 and C2 and tips B3 and C3 of teeth B and C. Further jets of filtered cool oil 46, 47 (FIG. 4) are directed into the tooth space ahead and behind inductor head 40 (30) as shown. Jets 46, 47 may be directed at an angle, as are jets 34, 35, on to the end of head 40 (30) or parallel to the gear axis along the tooth space. Jets 46, 47 may also be directed into the tooth space downwards at an angle to the gearwheel axis to create turbulence. The particular simple and/or compound angles of jets 44, 45, 46 and 47 have been determined by experiment; it is essential to get the cool oil flow to contact the metal surface and this means that routes for the removal of heated oil must be available and not "blocked" by the inflow from the jets.

The filtered cool oil is supplied to the induction heating assembly 11 (FIG. 1) by pipe 10 where it is directed to jets 44, 45, 46 and 47; these jets are fixed relative to head 40 and guides 41, 42 so that the whole moves as a preset unit. Cooling water 12 and electric power 13 (FIG. 1) are supplied to the induction heating assembly 11 and thence via copper pipes 20 (FIG. 2) to inductor head 40. Induction heating assembly 11 includes equipment for traversing inductor head and its associated equipment of guides 41, 42 and jets 44, 45, 46 and 47, controlling electrical power 13, cooling water 12 and cooling oil 10; preferably, cuts out are incorporated to guard against failure of any of the cooling oil jets or cooling water flow. Servo mechanisms, using microswitches incorporated into guides (41, 42, 31) are used to control the traversing motion of inductor head 30 along the tooth space. When helical gear teeth are being surface hardened, the rotation of the gearwheel 1 (FIG. 1) is controlled simultaneously with the traversing of the inductor head. Induction heating assembly 11 may also be controlled to harden all teeth sequentially around the whole gearwheel by suitably programmable control apparatus.

It will be noted from FIG. 1 that the whole of the inductor head 11a, i.e. the whole of FIG. 2, and its associated equipment of guides 41, 42 and jets 44, 45, 46 and 47 are all submerged in oil 3 in tank 1, i.e. below oil surface 4.

Referring to FIG. 3, the inductor head 30 is shown heat treating flanks B2 and C1. Due to conduction of heat through tooth B, and despite the cooling of oil jet 34, heating of the already hardened layer 33 of flank B1 will occur. This results in "back tempering" of flank B1. In high powered marine applications, the reverse power requirement is usually less than the ahead power requirement so that gearwheel 1 is mounted in tank 2 in such a way that flanks A2, B2, C2 etc. will be under load when transmitting ahead power and flanks A1, B1, C1 etc. for astern power. It will be noted that when inductor hed 30 makes its last traverse, one ahead flank, e.g. C2 as shown in FIG. 2, will be back tempered and one astern flank, e.g. C1, will be fully hardened; the parameters of the hardening process are always chosen so that the back tempered ahead flank at least meets the design requirements.

In order to achieve tooth hardnesses which are predictable between one gearwheel and the next and consistent within one gearwheel, the following parameters are important.

(i) Material of gear teeth must possess adequate mechanical and metallurgical properties.

(ii) Level, uniformity and distribution of heat in tooth and root.

(iii) Level of cooling.

(iv) Effect of back tempering.

The requirements of the above parameters have been determined by research and experiment. The important features of each parameter are detailed below.

(i) Material of Gear Teeth

The steel chosen must possess adequate mechanical properties and an appropriate chemical composition.

(ii) Level, Uniformity and Distribution of Heat in Tooth and Root

To achieve consistent results, the temperature of each tooth must be the same at the start of each traverse. Thus at the end of each traverse, when the inductor head and guide 41 or 42 have moved completely out of the gear space, the power to the inductor assembly is switched off and inductor head 30 "dwells" for a predetermined time period. This dwell time allows the heat generated in the previous traverse and conducted into the gearwheel 1 to be dissipated into the oil and away via pump 7 and cooler 9. Pump 7 (and stirrer 14 if fitted) maintains a considerable flow to keep oil 3 thoroughly mixed and minimise the dwell time. However, it is envisaged that the process may be operated satisfactorily even without making provision for a predetermined dwell period, provided that a sufficiently effective cooling action takes place during each traverse by increasing the coolant supply rate, and/or the number of jets in the locality of the inductor 30.

A particular level of heat input is required to raise the metal temperature to the predetermined value. The level of heating is determined by:

(a) Voltage, amperage and frequency of power in inductor head 30.

(b) Duration of heating, i.e. length of inductor head 30 and its speed of motion through the gear space.

(c) Projected area of inductor head on flanks, i.e. length and height of head.

(d) Clearances between inductor head 30 and the root, and between the inductor head 30 and the flanks of the gear teeth.

For any particular gear tooth size, factors a, b and c will be predetermined and factor d used to control the exact amount of heat induced in the adjacent metal.

To achieve the required surface metal temperature more heat must be input at the root than on the flank; this is because the mass of metal at the root is greater, with consequently greater heat loss due to conduction, than on the flank or near the tip. To allow for this, the profile of inductor heat 30 is carefully varied so that the clearance between inductor head 30 and the metal of the gearwheel progressively increases from a minimum near the root and along the gear flank. This profiling is carefully done so that the heat generated in the metal matches the changing thermal requirements to give a substantially constant temperature in the surface layer 33. At the root, close uniform clearance is maintained over arc 36 (FIG. 2) to ensure the maximum input of heat to the metal. From the ends of arc 26 upwards along the flanks, the clearance progressively increases so that the rate of heat input progressively decreases towards the tip. The head 30 terminates at a predetermined distance below the tip so that overheating at the tip does not occur. Small diameter pipes 20 located on the axis of inductor 11a (FIG. 2b) are used as the input-/output conductors to minimize the induction of stray currents near the tips of the gear teeth. Excessive heat input at the tip can lead to excessive hardness and through penetration with the possibility of brittle fracture and/or spalling.

As will be apparent from FIG. 3, the height of the inductor head is appreciably less than the (radial) depth of the space between the root and the tips of two adjacent gear teeth, and this is a most important aspect of the process and apparatus of the invention, in that it contributes to the avoidance of excessive heat build-up at the tips of the gear teeth, which can occur with known induction hardening techniques in which an inductor head or conductor is used which is larger than i.e. protrudes radially from, the space between the gear teeth. Typically, in the illustrated embodiments, the height of the inductor head is from a half to seven eighths of the depth of the gear tooth space.

Figure 5:
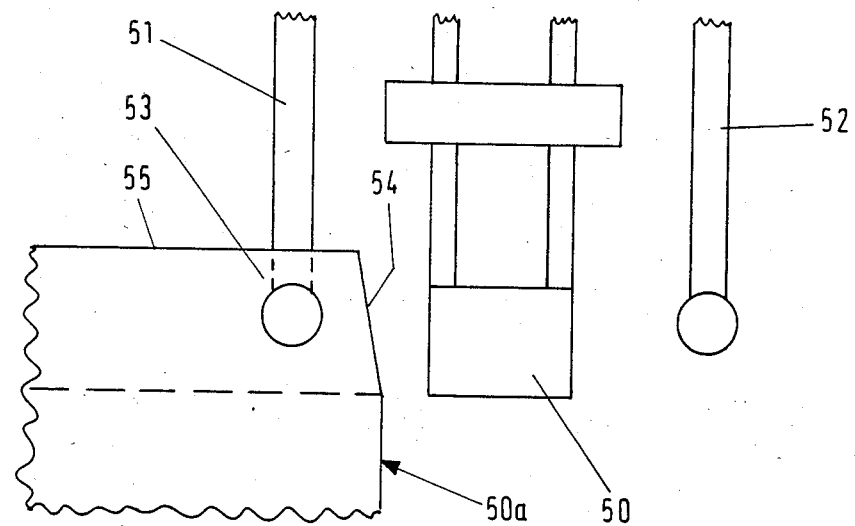
FIG. 5 is a diagrammatic elevation of the inductor head about to enter (or just leaving) the space between two adjacent gear teeth on a flat rack-type gear.

Uneven heat input could also occur at the edges of the teeth when inductor 30 enters or leaves a tooth space at the start or end of a traverse. A preferred method of obtaining uniform heating along the loaded portion of the gear teeth is shown in FIG. 5. Here an inductor head 50 is just about to enter the gap between adjacent teeth on a flat rack-type gear 50a. Guide 51 has already entered a nearby gap and is sliding along the flanks 53 of the gear teeth to locate inductor head 50 accurately. At the end face of the gear teeth is a chamfered "run-in" 54. Run-in 54 of the gear is not a load bearing surface and is used only to allow heat to build up to the required levels so that by the time inductor head 50 reaches the loaded portion 55 of the gear, uniformity of temperature has been attained throughout the surface layer 33 (FIG. 3). A similar chamfered run-out (not shown) is provided at the other face of the gearwheel.

After the trailing guide 52 (or 51) leaves a run out, the power may be switched off and inductor head 50 may "dwell" for a predetermined period to allow the heat generated in the previous traverse to be dissipated and the gear moved on by one pitch i.e. indexed prior to starting the next traverse.

Where a chamfered run in (run out) cannot be provided, excessive heat build-up at the tooth edges can be controlled by either progressively increasing the power in inductor head 50 as it enters the gear or by moving inductor head 50 towards the gear quickly and progressively slowing it down as it enters the tooth space so that it reaches its normal speed when the whole of the inductor head has entered the tooth space. On leaving the tooth space, the process would be reversed.

(iii) Level of Cooling

The rate of cooling critically affect hardness. Generally the more rapid the cooling, the harder is the metal as a result. However, excessive hardness leads to surface stresses which can result in the metal becoming brittle. Brittle failure has been known to occur with induction hardened gears cooled with water or water-based oils, and it is for this reason that mineral oil or any other suitable non-aqueous quenching agent is used as the coolant in the process and apparatus of the invention.

The ideal for gear teeth is a reasonably thick hardened surface layer 33 (FIG. 3) possessing a degree of ductility so that when the teeth are loaded, both substrate metal and hardened surface can flex together. This may be achieved by induction heating and relatively rapid cooling with mineral oil jets rather than quenching with water or water-based oils. Because the gearwheel 1 is fully submerged in mineral oil, it can achieve a uniform isothermal condition unaffected by day or night temperature transients. Thus only those stresses generated during hardening actually remain in the gearwheel. As the gearwheel is totally submerged in oil, all the heat due to hardening is rapidly dissipated either directly to the oil or by conduction in the metal direct and then to the oil.

(iv) Effect of Back Tempering

Back tempering is unavoidable with induction hardening by the tooth by tooth process, but its effects are minimised by:

(a) Submerging the whole gearwheel in oil to provide the maximum available heat sink.
(b) The use of oil jets onto the metal, particularly 34(44) but also 46 and 47.
(c) The dwell time at the end of each traverse to allow for removal of all heat generated during the previous traverse.
(d) The design of inductor head and its speed of motion which allows only the required amount of heat to be induced in the adjacent surface layer of the teeth, i.e. there is no excess heat available for back tempering.

The results of the process described above show that by methodical innovative work and attention to detail, induction hardened gearwheels can be produced which can out-perform any available from other known induction hardening processes. In this context, out-performance means in terms of load carrying capacity and reliability. This process has been developed over an extended period with gears produced being tested comparatively with those produced by other processes. Gears produced by this process have also been tested to failure, where this was possible.

At the end of each traverse of the inductor head (during the dwell period), the gear is advanced incrementally to bring the next adjacent pair of gear teeth into register with the inductor head and guides ready for a subsequent traverse. This incremental motion will be a small angular movement in the case of a gear wheel, or limited linear motion in the case of, say, a rack. This may be carried out manually, or may be controlled automatically by suitable selection of a programmable control of the apparatus.

The careful control of the parameters of the process ensure consistent production of gear teeth with a surface hardened case to an adequate depth and effectively net internal built-in compressive stresses, in the tooth surfaces i.e. in that part of the surface-hardened layer nearest to and containing the working surface of each tooth. Thus, the surface hardened layer extends around the root curve through the transition between the root curve and the flank surfaces i.e. the "fillet" (which is usually the most highly stressed region of a gear tooth in service); and preferably also along the tooth flanks. The generation of compressive stresses is critical and is analogous to the pre-stressing of concrete.

When a gear tooth is loaded, it flexes slightly, thereby generating relatively small tensile and compressive stresses in the tips and flanks of the tooth, and relatively greater tensile and compressive stresses in the roots at either side, and in the transition regions between the roots and the flanks (i.e. in the root fillets). If a tensile stress should already be present in the metal surfaces after hardening (as may occur with existing surface-hardening techniques), an applied tensile stress due to bending will become additive and failure soon occurs. If, however, there is an internal compressive stress e.g. in the roots, or in the root fillets, the tensile stress due to bending and the internal compressive stress become additive in the algebraic sense. In this situation, a considerably higher load can be taken by the teeth before the tensile stress due to bending can overcome the internal compressive stress and exceed the ultimate tensile strength to cause failure i.e. there is a substantial improvement in the fatigue bending properties of the gear teeth.

The exact nature of the molecular re-orientation which takes place within the surface-hardened layer 33 is not entirely clear, but it is believed that it is of such a nature that it effectively provides the equivalent to a built-in compressive stress in the working surfaces of the teeth. Thus, this built-in compressive stress is contained in the actual working face of each gear tooth in what is effectively an integral "skin" (33a, FIG. 3) of the layer 33. Gear tooth failure under the action of applied fatigue bending stresses is usually a form of tensile failure of the tooth which starts at the root fillet surface, and tests have shown that gear teeth which have been surface-hardened by a process and apparatus according to the invention have been able to perform much more reliably than similar gear teeth which have been surface-hardened by existing induction hardening techniques. It is believed that this superior operating performance arises by virtue of, effectively, the building of a compressive stress into the surface layer of the hardened case. In service, when an intermittent bending load is applied to the gear tooth, this built-in compressive stress must first be overcome (if at all) before any net tensile stress is applied to the tooth surface.

Though this specification has been written with reference to gear teeth, other metallic components having regular forms may be hardened in like manner.

Other modifications to the process described will be apparent to those skilled in the art, all falling within the scope of the invention described hereinbefore.

What I claim is:

1. A process for induction hardening of the flank and root surfaces of the teeth of a gear so as to provide a surface-hardened layer along said surface, the process comprising:

(1) causing relative traversing movement of an electrically energisable inductor head along the space between a pair of adjacent gear teeth, the inductor head having an external profile substantially matching the profile of the space defined between the gear teeth;

(2) guiding the traversing movement of the inductor head so as to maintain predetermined clearances between the outer surface of the inductor head and the root and flank surfaces of the pair of gear teeth, the clearance being a minimum between the inductor head and the root surface and varying in predetermined manner along the flank surfaces in such a way as to achieve heating along the flank and root surfaces to a substantially uniform predetermined temperature suitable for induction hardening; and (3) directing coolant to the surfaces of the unheated flanks, the tips, the heated flanks and the root of the pair of gear teeth so as to achieve relatively rapid cooling of said surfaces:

in which:

(a) the entire gear is immersed in a tank of coolant;
(b) the coolant is a non-aqueous quenching agent;
(c) the height of the inductor head is less than the depth of the space between the root and tip surfaces of each pair of gear teeth; and
(d) the operating parameters of (i) the predetermined clearances, (ii) the rate of electrical energy supplied to, and the speed of traversing movement of the inductor head and (iii) the rate of cooling, are controlled in such a way as to form a substantially uniform thickness surface-hardened layer from tip to tip along the flank and root surfaces of the pair of gear teeth, said surface-hardened layer having an internal structure which provides the equivalent of a built-in compressive stress in its surface, at least in the region of each root surface and its transition to the flank surfaces.

2. A process according to claim 1, in which the gear is a gear wheel which is mounted substantially vertically in said tank.

3. A process according to claim 1, in which the cooling of the inductively heated surfaces includes the provision of a predetermined dwell period between the end of one traverse of the inductor head along the space between one pair of gear teeth and the next traverse along the space between an adjacent pair of gear teeth.

4. A process according to claim 3, in which the gear is indexed, at the end of each traverse of the inductor head, so as to bring the next pair of gear teeth into register with a guide for the inductor head.

5. A process according to claim 1, in which the gear has helical gear teeth, and said gear is rotated simultaneously with the traversing movement of the inductor head so as to constantly maintain the required predetermined clearances.

6. A process according to claim 1, in which each tooth of the gear has, at each end thereof, a chamfered run-in.

7. A process according to claim 1, in which the coolant is mineral oil.

* * * * *